(12) United States Patent
Blake et al.

(10) Patent No.: US 6,466,959 B2
(45) Date of Patent: Oct. 15, 2002

(54) APPARATUS AND METHOD FOR EFFICIENT ARITHMETIC IN FINITE FIELDS THROUGH ALTERNATIVE REPRESENTATION

(75) Inventors: Ian F. Blake, Palo Alto, CA (US); Ron M. Roth, Ramat Gan (IL); Gadiel Seroussi, Cupertino, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/751,438

(22) Filed: Feb. 26, 2001

(65) Prior Publication Data

US 2001/0007111 A1 Jul. 5, 2001

Related U.S. Application Data

(63) Continuation of application No. 09/104,894, filed on Jun. 25, 1998, now Pat. No. 6,199,087.

(51) Int. Cl.[7] ............................................. G06F 7/00
(52) U.S. Cl. ....................................................... 708/492
(58) Field of Search ................................ 708/491–492; 380/28

(56) References Cited

U.S. PATENT DOCUMENTS

| | | | | | |
|---|---|---|---|---|---|
| 5,227,992 A | * | 7/1993 | Lee et al. | .................. | 708/492 |
| 5,467,297 A | * | 11/1995 | Zook | .......................... | 708/492 |
| 5,612,910 A | * | 3/1997 | Meyer | ........................ | 708/492 |
| 6,138,133 A | * | 10/2000 | Oh | ............................. | 708/492 |
| 6,141,420 A | * | 10/2000 | Vanstone et al. | ........... | 708/492 |
| 6,230,179 B1 | * | 5/2001 | Dworkin et al. | ............ | 708/492 |

* cited by examiner

Primary Examiner—Tan V. Mai (57) ABSTRACT

A method and apparatus are shown for performing efficient arithmetic on binary vectors in a finite field. Typically, there is an efficient algorithm within an execution context, such as hardware or software, for performing a selected arithmetic operation on an operand. When the operand is in a first representative format and the efficient algorithm operates in an alternative representation format, then the operand is permutated from the first representative format to the alternative representation format. The efficient algorithm is then performed on the operand in the alternative representation format in order to obtain a result in the alternative representation format. The result is then permutated from the alternative representation format to the first representation format. Thus, efficient arithmetic is obtained by using the most efficient algorithm available in either the first representation format or the alternative representation format and permuting operands and results to the representation format corresponding to the most efficient algorithm available.

10 Claims, 4 Drawing Sheets

APPARATUS AND METHOD FOR EFFICIENT ARITHMETIC IN FINITE FIELDS THROUGH ALTERNATIVE REPRESENTATION

This application is a continuation of Ser. No. 09/104,894 filed on Jun. 25, 1998 now U.S. Pat. No. 6,199,087.

BACKGROUND OF THE INVENTION

1. Field of the Invention

The present invention relates generally to methods and circuits for computing and, more particularly, to methods and circuits for computing the product of two elements in a finite field or the inverse of an element in a finite field.

2. Description of the Related Art

Multiplication over large finite fields, also known as Galois fields, is used in the implementation of certain cryptographic protocols based on a theory of elliptic curves over Galois fields. These cryptographic protocols are highly computationally intensive and therefore consume a significant level of computational resources in order to perform Galois field arithmetic. Consequently, any reduction in the number of operations required for Galois field arithmetic will have a significant impact on the overall consumption of computational resources.

Generally speaking, a field is a number system with addition, subtraction, multiplication and division. The operations on the elements of the field should be associative, distributive and commutative. Therefore, there should be an element 0, where 0+x=x, and an element 1, where 1*x=x. In addition, for every x, there is a (−x), where x+(−x)=0. Further, for every value of x that is not 0, there is an inverse (1/x) where x*(1/x)=1.

Some well-known examples of fields are the real numbers, the rational numbers and the complex numbers. Each of these sets have an infinite number of elements and are therefore infinite fields.

Finite fields have a finite number of elements. As an example, when p is a prime number, a finite field GF(p) is a field with p elements. The elements of the field GF(p) may be taken to be 0, 1, ..., p−1. Elements of the field may be added, subtracted and multiplied, but the resulting number is reduced modulo the value of p (mod p) at the end of the computation. See Chapter 4 of MacWilliams and Sloane, *The Theory of Error-Correcting Codes*, North Holland, 1977.

The smallest of all fields is the finite field GF(2), which is a finite field having two elements: 0 and 1. The elements may be added, subtracted, multiplied and divided. However, 1+1=0, because the modulo equivalent of the result of the addition, 2, is 0, i.e. 1+1=2 mod 2=0. Similarly, 0−1=1, because the result of the subtraction, (−1), is reduced modulo the value of p, which is 2, the result of the subtraction is a modulo 1, i.e. 0−1=(−1) mod 2=1.

Another type of finite field is GF($2^n$), a field with $2^n$ elements. GF($2^n$) is an n-th degree extension of GF(2).

The finite field GF($2^n$) is a vector space of dimension n over GF(2). As such, it can be represented using any basis of n linearly independent elements of GF($2^n$) over the binary field GF(2). Therefore, elements of GF($2^n$) are represented by binary vectors of length n. Field addition is realized in all bases by a bit-wise exclusive OR (XOR) operation, whereas the structure of field multiplication is determined by the choice of basis for the representation.

There are several representations of extension fields GF($2^n$) that lend themselves to efficient arithmetic implementation over the binary field GF(2).

Two families of bases are commonly used to represent the field GF($2^n$): standard (or polynomial) representation and normal basis (NB) representation. For certain values of n, a special case of the letter is called optimal normal basis (ONB).

In standard polynomial representation, the basis elements have the form $1, \omega, \omega^2, \ldots, \omega^{n-1}$, where $\omega$ is a root in GF($2^n$) of an irreducible polynomial P(x) of degree n over GF(2). In an equivalent interpretation of this representation, the elements of GF($2^n$) are polynomials of degree at most n−1 over GF(2), and arithmetic is carried out modulo an irreducible polynomial P(x) of degree n over GF(2).

In ONB representation, the basis elements have the form $(\alpha, \alpha^2, \ldots, \alpha^{2^{n}})$ for a certain element $\alpha \in$ GF($2^n$). This defines a normal basis. In addition, if for all $0 \leq i \neq j \leq n-1$ there exists k, l such that, $$\alpha^{(2^i \cdot 2^j)} = \alpha^{2^k} + \alpha^{2^l},$$

then the basis is called optimal. The element $\alpha$ is called the generator of the basis. Optimal normal bases exist for an infinite subset of values of n defined later on.

When the polynomial P(x) is sparse, the standard representation lends itself to efficient software implementations of the field arithmetic. In the software execution context, there are efficient implementations for polynomial multiplication and inversion. On the other hand, the ONB representation typically allows for more efficient hardware implementations of field multiplication. See Ch. 5 of Menezes et al, *Applications of Finite Fields*, Kluwer, Boston, 1993 and Omura and Massey (U.S. Pat. No. 4,587,627). Inversion, however, remains a difficult operation in the hardware execution context. Addition is typically easy to accomplish in either execution context.

Large finite fields are the basis of many modern cryptographic algorithms, e.g. elliptic curve cryptography. In these applications, n is typically on the order of 100 which, using some conventional algorithms, can require thousands of operations in order to perform a computation. The field arithmetic therefore becomes a computational bottleneck and use of the most efficient implementations available is important to reducing the overhead required to perform cryptographic operations. On the other hand, the explosive development of the Internet is expected to make the use of encryption become widespread, and will require hardware and software implementations to interoperate and use common representations.

Accordingly, the need remains for a method for making use of efficient algorithms to perform arithmetic operations in large finite fields.

SUMMARY OF THE INVENTION

It is, therefore, an object of the invention to reduce execution overhead by using the most efficient algorithms available in a given execution content to perform finite field computation.

An embodiment of a method for performing efficient arithmetic in a finite field, according to the present invention, involves receiving a first operand having a first representation format and permuting the format of the first operand from the first representation format to an alternative representation format. The method also involves receiving a second operand having the first representation format and permuting the second operand from the first representation format to the alternative representation format. Then a result having the alternative representation format is generated by performing a selected arithmetic operation on the first and second operands. The format of the result is then permuted from the alternative representation format to the first representation format.

Another embodiment of a method for performing an inversion operation in a finite field, according to the present invention, includes receiving an operand having an optimal normal basis (ONB) format, permuting the format of the operand to an alternative representation format, and generating a result having the alternative representation format by inverting the first operand.

Yet another embodiment of a method, according to the present invention, for performing an arithmetic operation on first and second n-length vectors having a first representation format in a finite field $GF(2^n)$ in a predetermined execution context includes selecting an efficient algorithm for the arithmetic operation based upon the predetermined execution context, selecting an execution representation format based upon the selected efficient algorithm, where the execution representation format is one of the first representation format and a second representation format, permuting the first and second vectors from the first representation format to the second representation format when the selected execution representation format is the second representation format, and performing the arithmetic operation on the first and second vectors to obtain a result having the selected execution representation format.

Still another embodiment of a method for performing an arithmetic operation on an n-length vector having a first representation format in a finite field $GF(2^n)$ in a predetermined execution context, according to the present invention, involves selecting an efficient algorithm for the arithmetic operation based upon the predetermined execution context, selecting an execution representation format based upon the selected efficient algorithm, where the execution representation format is one of the first representation format and a second representation format, permuting the vector from the first representation format to the second representation format when the selected execution representation format is the second representation format, and performing the arithmetic operation on the vector to obtain a result having the selected execution representation format.

Yet another embodiment of an apparatus for performing an arithmetic operation in a finite field, according to the present invention, is composed of a first buffer configured to receive and store a first input operand having a first representation format, a first format converter configured to convert the first input operand to a first converted operand having a second representation format, and a second buffer configured to receive and store the first converted operand. A functional unit is configured to receive the first converted operand from the second buffer and perform the arithmetic operation on the first converted operand in order to generate a first result having the second representation format. The apparatus also includes a third buffer configured to receive and store the first result, a second format converter configured to convert the first to a second result having the first representation format, and a fourth buffer configured to receive and store the second result.

An embodiment of a computer readable medium having stored therein a plurality of routines, according to the present invention, includes a first routine configured to convert a first operand having a first representation format to a second operand having a second representation format, a second routine configured to perform a first arithmetic operation on the second operand in order to obtain a first result having the second representation format, and a third routine configured to convert the first result to a second result having the first representation format.

The foregoing and other objects, features and advantages of the invention will become more readily apparent from the following detailed description of several embodiments of the invention which proceeds with reference to the accompany drawings.

DETAILED DESCRIPTION OF THE PRESENT INVENTION

Embodiments of a method and apparatus, according to the present invention, will now be discussed. With respect to these embodiments, a representation of the field $GF(2^n)$ for various n's is described, wherein the field elements are palindromic polynomials, and the field operations are polynomial addition and multiplication in the ring of polynomials modulo $x^{2n+1}-1$ over $GF(2)$. This representation can be shown to be equivalent to a field representation of Type-II optimal normal bases. As such, the suggested palindromic representation inherits the advantages of two commonly-used representations of finite fields, namely, the standard (polynomial) representations and the optimal normal base representation.

Modular polynomial multiplication is well suited for software implementations, whereas the optimal normal basis representation admits efficient hardware implementations. Palindromic representation allows for efficient implementation of field inversion in both hardware and software. Efficient field arithmetic is crucial in cryptographic applications of finite fields, where values of n in the hundreds are used. In particular, field arithmetic is the computational bottleneck in elliptic curve cryptography applications.

The field representation that we suggest here inherits the advantages of both polynomial and ONB representation. In palindromic representation, the field elements will be a subset of the polynomials of degree $\leq 2n$ over $GF(2)$, and the arithmetic will be carried out modulo the very sparse polynomial $x^{2n+1}-1$. As such, this representation inherits the advantages of the polynomial representation, and it can be efficiently implemented in software applications. On the other hand, our representation can be shown to be equivalent, up to a simple bit permutation and replication operation, to the ONB representation. As such, it will be attractive for hardware applications as well, in addition to providing an efficient inversion operation for ONBs.

Palindromic Representation of Finite Fields

We hereafter assume that $2n+1$ is a prime p, and that one of the following two conditions holds:
(i) the multiplicative order of 2 modulo p is 2n (namely, 2 is primitive modulo p); or
(ii) $p \equiv 3 \pmod 4$ (i.e., $-1$ is a quadratic nonresidue modulo p) and the multiplicative order of 2 modulo p is n (namely, 2 generates the quadratic residues modulo p).

For such values of n, let γ be a pth root of unity in $GF(2^{2n})$. It is known that $\alpha = \gamma + \gamma^{-1}$ generates an optimal normal basis, referred to as a Type-II ONB. The optimality refers to a well defined measure of the hardware complexity of a multiplier for any normal basis representation of the field. See Ch. 5 of Menezes et al, *Applications of Finite Fields,* Kluwer, Boston, 1993 and Omura and Massey (U.S. Pat. No. 4,587, 627).

Let Φ denote the vector space of all polynomials over GF(2) of the form:

$$a(x) = \sum_{i=1}^{2n} a_i x^i$$

where $a_i = a_{p-i}$ for $i=1, 2, \ldots, n$. We call such polynomials palindromic polynomials. In our palindromic representation of $GF(2^n)$, each field element is represented as a palindromic polynomial. Addition is defined as the ordinary polynomial addition of elements in Φ, and the product of two palindromic polynomials $a(x), b(x) \in \Phi$ is the unique palindromic polynomial $c(x) \in \Phi$ such that $$c(x) \equiv a(x) \cdot b(x) \pmod{x^p - 1}. \quad (1)$$

It can be shown that such a unique polynomial $c(x) \in \Phi$ always exists. Furthermore, formula (1) suggests that multiplication can be implemented for the palindromic representation using standard polynomial multiplication. The latter can be performed very efficiently in software using long ("naive") multiplication or one of the various known fast algorithms. The formula (1) also suggests using known techniques for inversion under the standard representation of $GF(2^n)$.

When we substitute $x = \gamma$ in $a(x)$, we obtain $$a(\gamma) = \sum_{i=1}^{2n} a_i \gamma^i = \sum_{i=1}^{n} a_i (\gamma^i + \gamma^{-i}).$$

It follows from conditions (i) or (ii) above that for every $i \in \{1, 2, \ldots, n\}$, exactly one element in the pair $\{i, p-i\}$ can be written as $2^j$ modulo p, for some $0 \leq j \leq n-1$. Hence, we can write $$a(\gamma) = \sum_{j=0}^{n-1} a_{2^j} \left( \gamma^{2^j} + \gamma^{-2^j} \right) = \sum_{j=0}^{n-1} a_{2^j} (\gamma + \gamma^{-1})^{2^j} = \sum_{j=0}^{n-1} a_{2^j} \alpha^{2^j} \quad (2)$$

where all indexes are taken modulo p. It follows from equation (2) that, up to permutation, the elements $a_1, a_2, \ldots, a_n$ are the coefficients in the normal basis representation of $a(\gamma)$ that corresponds to the generator α. This simple relationship between the coefficients of $a(x)$ and the normal basis representation of $a(\gamma)$ implies that, in a hardware implementation, an efficient optimal normal basis representation multiplier can be used for the palindromic representation, provided the coefficients are permuted accordingly.

Therefore, in light of the discussion above, there is a one-to-one function $\pi: \{0, 1, 2, \ldots, n-1\} \rightarrow \{1, 2, 3, \ldots, n\}$ defined over $0 \leq i \leq n-1$, where $j = 2^i \bmod p$, and if $0 < j < n$, then $\pi(i) = j$, else $\pi(i) = p - j$. Further, there is an inverse function $\sigma: \{1, 2, 3, \ldots, n\} \rightarrow \{0, 1, 2, \ldots, n-1\}$ defined such that $\sigma(j) = i$ whenever $\pi(i) = j$. An ONB format vector will take the form $(a_{n-1}, a_{n-2}, \ldots, a_1, a_0)$, wherein each value of $a_i$ represents the binary coefficient of $\alpha^{2^i}$ in the ONB representation of a finite field element a. A palindromic format vector will take the form $(b_1, b_2, \ldots, b_n, b_n, \ldots, b_2, b_1)$ wherein each value of $b_j$ represents the binary coefficient of $x^j$ in the palindromic representation of an element b.

Therefore, permutation from ONB format to palindromic format is obtained by setting $(b_1, b_2, \ldots, b_n, b_n, \ldots, b_2, b_1)$ to $(a_{\sigma(1)}, a_{\sigma(2)}, \ldots, a_{\sigma(n)}, a_{\sigma(n)}, \ldots, a_{\sigma(2)}, a_{\sigma(1)})$, respectively. Likewise, permutation from palindromic format to ONB format is obtained by setting $(a_{n-1}, a_{n-2}, \ldots, a_1, a_0)$ to $(b_{\pi(n-1)}, b_{\pi(n-2)}, \ldots, b_{\pi(1)}, b_{\pi(0)})$, respectively.

Thus, permutation of the coefficients between one representation format and the next can be accomplished with very simple software algorithms or hardware, such as the wiring interconnection shown in ONB-to-palindromic converter 120 of FIG. 3 and palindromic-to ONB converter 160 in FIG. 4, which are discussed in detail below.

As for the inversion computation, the palindromic representation allows for the use of the extended Euclidean (greatest common divisor) algorithm to find the inverse of the palindromic polynomial $a(x)$ modulo $x^p - 1$, from which the inverse in ONB representations are easily derived. The Euclidean algorithm admits efficient implementations in both hardware and software. See Berlekamp, Seroussi and Tong, *A Hyper-Systolic Reed-Solomon Decoder* in Ch. 10 of *Reed Solomon Codes and Their Applications,* Wicker and Bhargava (eds.), IEEE Press, New York, 1994.

Figure 1:
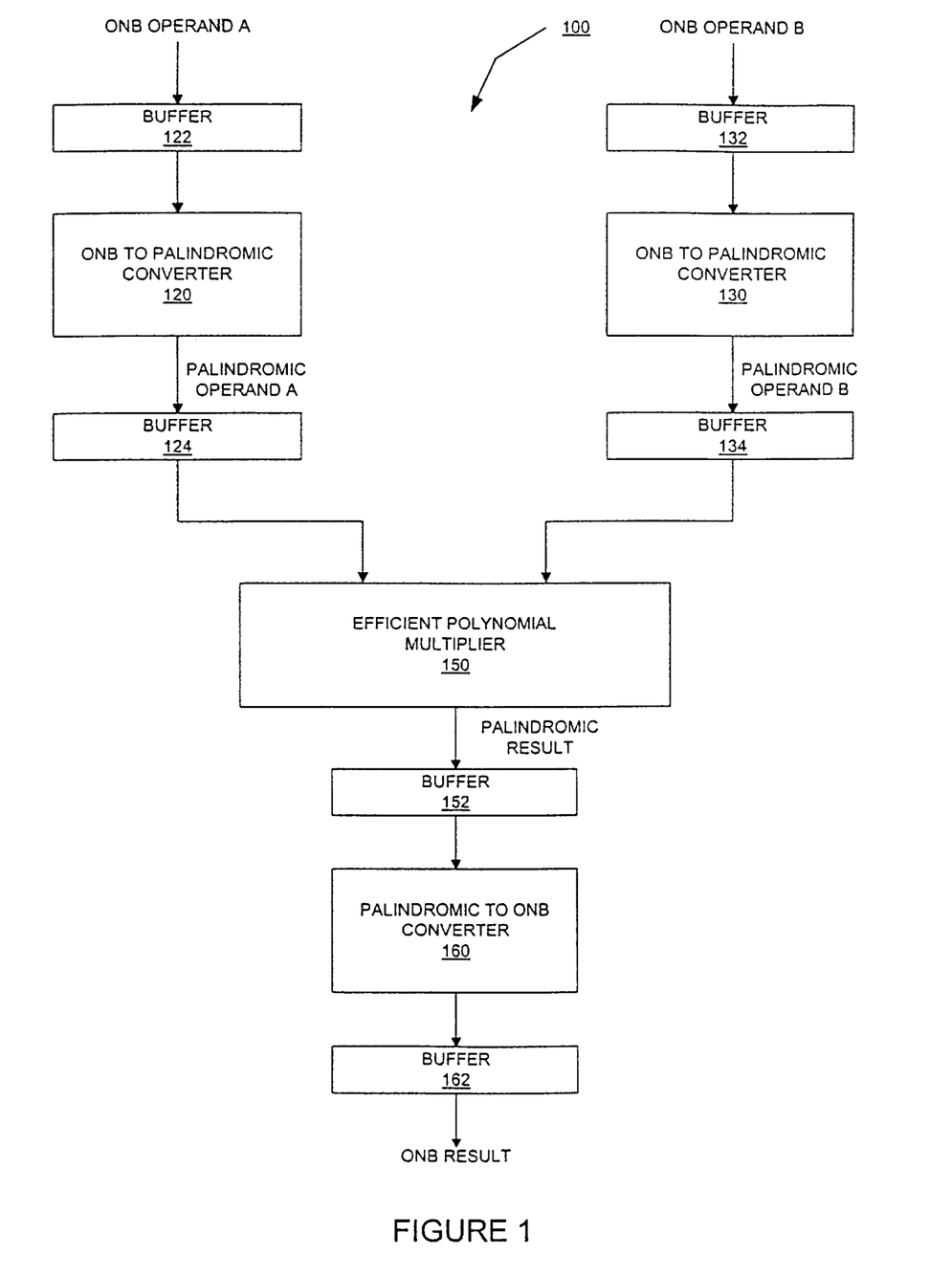
FIG. 1 is a block diagram of an architecture for multiplication according to an embodiment of the present invention.

Referring now to FIG. 1, an architecture 100 is shown for multiplying two ONB operands ONB OPERAND A and ONB OPERAND B. ONB OPERAND A and ONB OPERAND B are each n bit operands in ONB representation format.

ONB OPERAND A is input and stored in buffer 122. ONB to palindromic converter 120 receives ONB OPERAND A from buffer 122 and converts it to PALINDROMIC OPERAND A which is in palindromic format. PALINDROMIC OPERAND A is output to buffer 124 which stores the operand. Buffer 122 can be either an n bit buffer, if the buffer is not used as an accumulator during computation, or a 2n bit buffer, if it is used to accumulate the result.

Similarly, ONB OPERAND B is input to buffer 132 for conversion by ONB to palindromic converter 130 to PALINDROMIC OPERAND B which is stored in buffer 134.

PALINDROMIC OPERAND A and PALINDROMIC OPERAND B are each input to an efficient polynomial multiplier 150 which generates a PALINDROMIC RESULT which is output and stored in buffer 152. The PALINDROMIC RESULT is output from buffer 152 to palindromic to ONB converter 160 which converts the result to ONB representation format for output to buffer 162. Buffer 162 then stores the ONB RESULT.

The multiplier architecture 100 of FIG. 1 can be implemented in a software execution context where there are many highly efficient polynomial multiplication algorithms that are well understood by those of ordinary skill in the art for use as the efficient polynomial multiplier 150. The multiplier architecture 100 can also be implemented in hardware in order to take advantage of a polynomial muliplication hardware solution.

Figure 2:
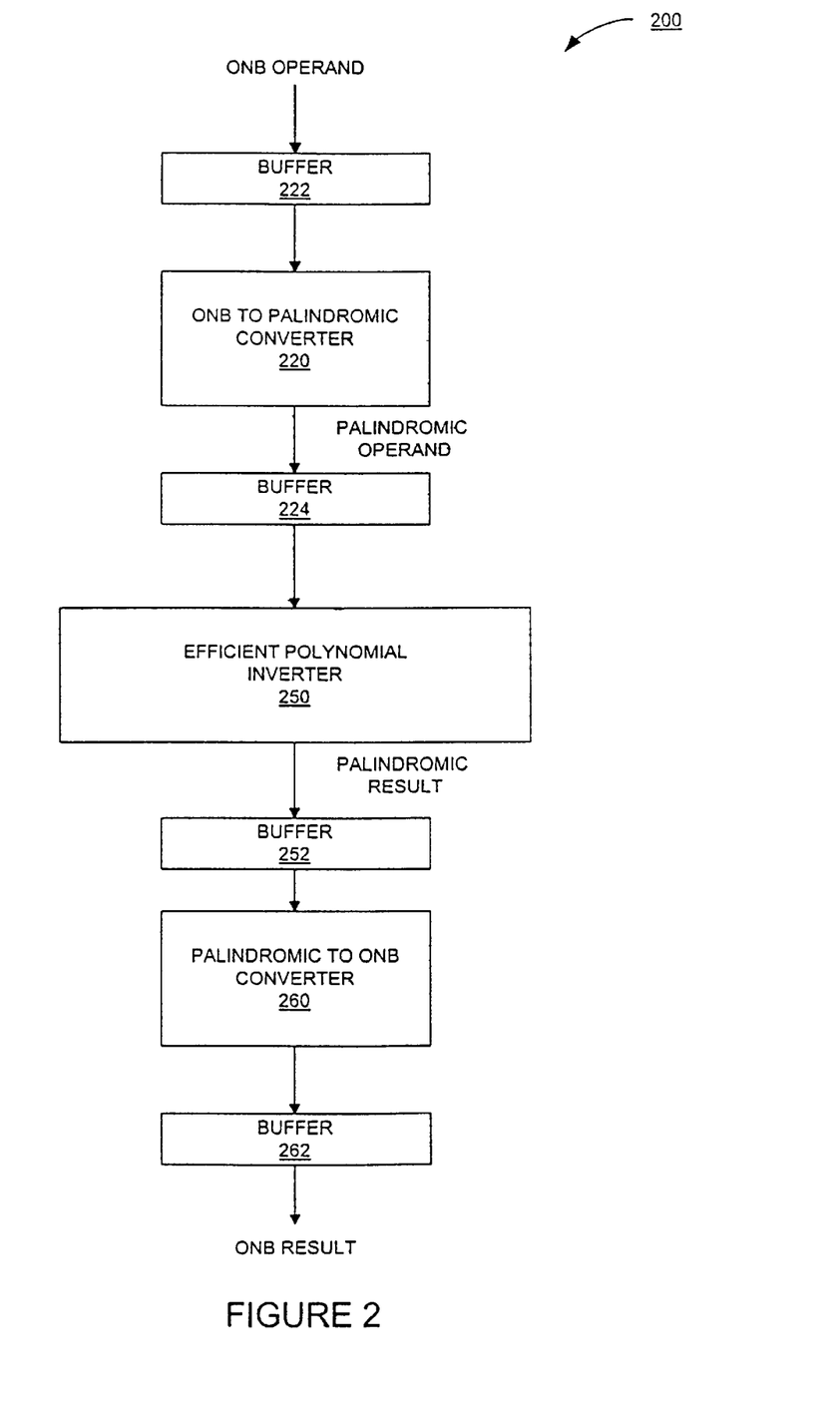
FIG. 2 is a block diagram of an architecture for invention according to an embodiment of the present invention.

Referring now to FIG. 2, an architecture 200 is shown for inverting an ONB OPERAND. The ONB OPERAND is input and stored in buffer 222. ONB to palindromic converter 220 receives the ONB OPERAND from buffer 222 and converts it to a PALINDROMIC OPERAND which is stored in buffer 224. The PALINDROMIC OPERAND, which is a palindromic polynomial, is input to efficient polynomial inverter 250 which inverts the operand to generate a PALINDROMIC RESULT which is stored in buffer 252. Palindromic to ONB converter 260 receives the PALINDROMIC RESULT from buffer 252 and converts it to an ONB RESULT which is stored in buffer 262.

The inverter architecture 200 can be implemented in either a software or hardware context. The well known Euclidean algorithm is one example of an algorithm that can be efficiently implemented as the efficient polynomial inverter 250 in either hardware and software.

Figure 3:
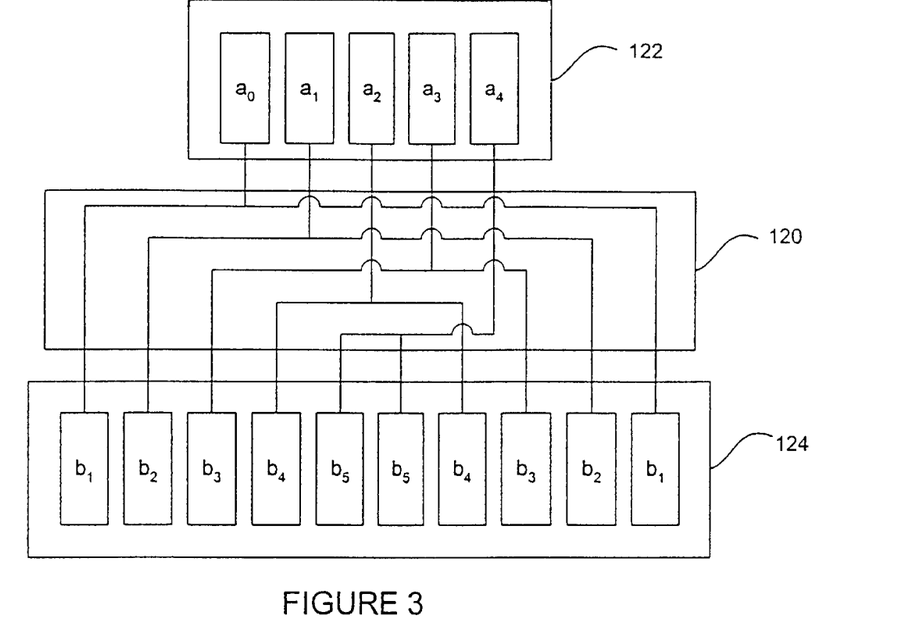
FIG. 3 is a functional block diagram of the ONB to palindromic converter of FIG. 1 and FIG. 2.
Figure 4:
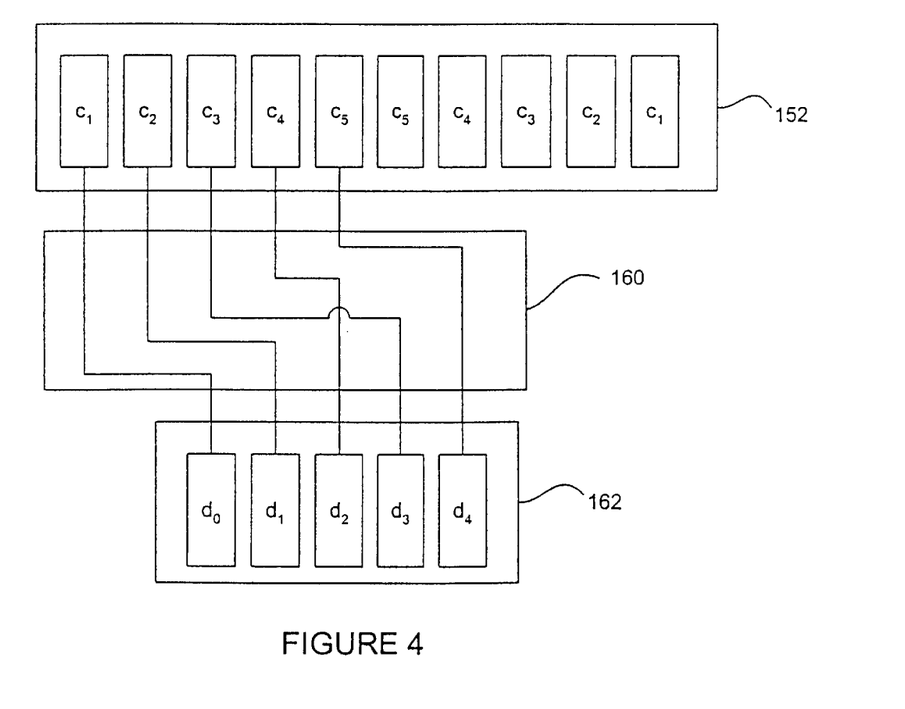
FIG. 4 is a functional block diagram of the palindromic to ONB converter of FIG. 1 and FIG. 2.

FIGS. 3 and 4 illustrate conversion from ONB to palindromic representation and conversion from palindromic to ONB representation, respectively. For the example illustrated, n=5 and p=11. Therefore, applying the conditions above yields the following tables:

| i | $2^i$ | $2^i$ mod 11 | $\pi(i)$ |
|---|---|---|---|
| 0 | 1 | 1 | 1 |
| 1 | 2 | 2 | 2 |
| 2 | 4 | 4 | 4 |
| 3 | 8 | 8 | 3 |
| 4 | 16 | 5 | 5 |

| j | $\sigma(j)$ |
|---|---|
| 1 | 0 |
| 2 | 1 |
| 3 | 3 |
| 4 | 2 |
| 5 | 4 |

FIG. 3 illustrates an embodiment of buffer 122, ONB to palindromic converter 120 and buffer 124 of FIG. 1 for the example where n=5. The embodiment illustrated in FIG. 3 is also applicable to describe buffer 132, converter 130 and buffer 134 of FIG. 1 and buffer 22, converter 220 and buffer 224 of FIG. 2.

Buffer 122 is configured to store an n-bit vector operand in ONB format where the bit positions of the buffer can be describe by $(a_0, a_1, \ldots, a_{(n-1)})$. In the example for n=5 shown, buffer 122 has positions $a_0, a_1, a_2, a_3$ and $a_4$.

Buffer 124 is configured to store an n-bit vector operand in palindromic format $(b_1, b_2, \ldots, b_n, b_n, \ldots, b_2, b_1)$ and will be configured to have either n or 2n positions, depending on whether the buffer is used as an accumulator or not, as mentioned above. If the buffer is not used as an accumulator, then it is unnecessary to use 2n bits for storage since $(b_n, \ldots, b_2, b_1)$ reflects the values of $(b_1, b_2, \ldots, b_n)$. In the example shown for n=5 with 2n bit positions used for storage, buffer 124 has positions $b_1, b_2, b_3, b_4, b_5, b_5, b_4, b_3, b_2$, and $b_1$.

ONB to palindromic converter 120 implements the function where the $(b_1, b_2, \ldots, b_n, b_n, \ldots, b_2, b_1)$ of buffer 124 are set to $(a_{\sigma(1)}, a_{\sigma(2)}, \ldots, a_{\sigma(n)}, a_{\sigma(n)}, \ldots, a_{\sigma(2)}, a_{\sigma(1)})$, respectively, of buffer 122. Thus, from the table above, the value of each of positions $(b_1, b_2, b_3, b_4, b_5, b_5, b_4, b_3, b_2, b_1)$ of buffer 124 are set to the value of positions $(a_0, a_1, a_3, a_2, a_4, a_4, a_2, a_3, a_1, a_0)$ of buffer 122, respectively, by converter 120.

The function of converter 120 can be accomplished using simple software algorithms. In addition, as can be seen from FIG. 3, converter 120 can be implemented in hardware as a network of interconnecting wires.

FIG. 4 illustrates an embodiment of buffer 152, palindromic to ONB converter 160 and buffer 162 of FIG. 1 for the example where n=5. The embodiment illustrated in FIG. 4 is also applicable to describe buffer 252, converter 260 and buffer 262 of FIG. 1.

Buffer 152 is configured to store an n-bit vector result in palindromic format $(c_1, c_2, \ldots, c_n, c_n, \ldots, c_2, c_1)$ and will be configured to have either n or 2n positions, depending on whether the buffer is used as an accumulator or not, as mentioned above. If the buffer is not used as the accumulator for the result, then it is unnecessary to use 2n bits for storage since $(c_n, \ldots, c_2, c_1)$ reflects the values of $(c_1, c_2, \ldots, c_n)$. In the example shown for n=5 with 2n bit positions used for storage, buffer 152 has positions $c_1, c_2, c_3, c_4, c_5, c_5, c_4, c_3, c_2$, and $c_1$.

Buffer 162 is configured to store an n-bit vector result in ONB format where the bit positions of the buffer can be described by $(d_0, d_1, \ldots, d_{(n-1)})$. In the example for n=5 shown, buffer 162 has positions $d_0, d_1, d_2, d_3$ and $d_4$.

Palindromic to ONB converter 160 implements the function where the positions $(d_{n-1}, d_{n-2}, \ldots, d_1, d_0)$ of buffer 162 are set to the value of positions $(c_{\pi(n-1)}, c_{\pi(n-2)}, \ldots, c_{\pi(1)}, c_{\pi(0)})$, respectively, of buffer 152. Thus, in the example illustrated, positions $(d_4, d_3, d_2, d_1$ and $d_0)$ are set to $(c_5, c_3, c_4, c_2, c_1)$.

Note that in both converter 120 and converter 160, that the bitwise conversion is transposed for the conversion of $(a_2, a_3)$ to $(b_4, b_3)$ and $(c_3, c_4)$ to $(d_3, d_2)$, respectively. This reflects the $\pi(i)$ and $\sigma(j)$ functions for the relatively simple example for n=5 described above.

The permutation required for format conversion is somewhat more complex for larger values of n, as can be demonstrated by showing the tables for n=9, p=19, which is as follows:

| i | $2^i$ | $2^i$ mod 19 | $\pi(i)$ |
|---|---|---|---|
| 0 | 1 | 1 | 1 |
| 1 | 2 | 2 | 2 |
| 2 | 4 | 4 | 4 |
| 3 | 8 | 8 | 8 |
| 4 | 16 | 16 | 3 |
| 5 | 32 | 13 | 6 |
| 6 | 64 | 7 | 7 |
| 7 | 128 | 14 | 5 |
| 8 | 256 | 9 | 9 |

| j | $\sigma(j)$ |
|---|---|
| 1 | 0 |
| 2 | 1 |
| 3 | 4 |
| 4 | 2 |
| 5 | 7 |
| 6 | 5 |
| 7 | 6 |
| 8 | 3 |
| 9 | 8 |

Whereas the bit permutation for the $\pi(i)$ and $\sigma(j)$ functions becomes more complex with greater values of n, the permutation can still be implemented in a simple software algorithm or simple wiring interconnection scheme.

Figure 5:
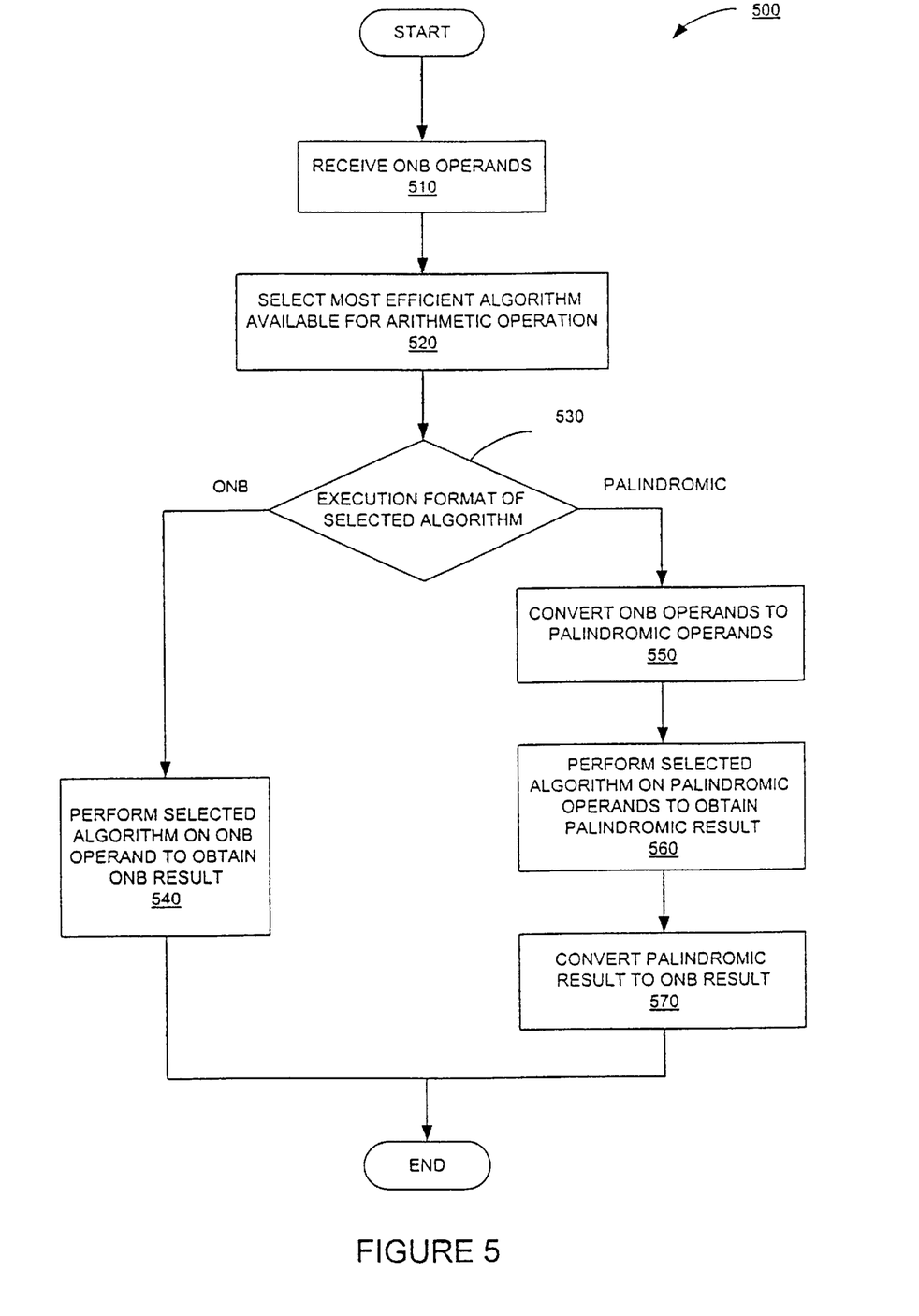
FIG. 5 is a flow chart illustrating an embodiment of a method for performing an arithmetic operation according to the present invention.

FIG. 5 is a flow chart illustrating an embodiment 500 of a method according to the present invention. After ONB operands are received at step 510, the most efficient algorithm for a given arithmetic operation is determined at step 520. As discussed above, the most efficient algorithm for a given execution context may operate in a different representation format than the format in which the operands are received.

If the most efficient algorithm available operates in palindromic format, then control branches at step 530 to step 550, where the ONB operands are converted to palindromic format. This conversion is obtained through a simple bitwise permutation of the ONB vector into a palindromic vector, as described in detail above. At step 560, the arithmetic operation is performed on the operands, now in palindromic format, using the selected algorithm in order to produce a palindromic format result.

The palindromic result is then converted to ONB format at step 570. Conversion of the result from palindromic format to ONB is obtained through a simple bitwise permutation of the result, as described in detail above.

If the algorithm selected at step 520 operates in ONB format, then control branches at step 530 to step 540, where the selected algorithm is used to perform the arithmetic operation in the original ONB format to obtain an ONB format result. Therefore, no conversion of the format of the operands or the result is necessary.

Though the detailed description above is discussed in the context of ONB and palindromic representation formats, the same approach can be applied to any pair of representation formats where each format is equivalent, though permuted, to the other representation format. Thus, when more efficient algorithms are available for certain arithmetic operations in the equivalent alternative representation, then the operands can be permuted into the alternative representation format for computation using the more efficient algorithm. The result of the computation can then be permuted back to the original representation format, if necessary. The present invention is therefore able to take advantage of the most efficient algorithms across several representations formats available for certain arithmetic operations, thereby reducing the computational overhead associated with executing the arithmetic operations.

Having described and illustrated the principles of the invention in some preferred embodiments thereof, it should be apparent that the invention can be modified in arrangement and detail without departing from such principles. We claim all modifications and variations coming within the spirit and scope of the following claims.

What is claimed is:

1. A method for performing an inversion operation in a finite field, at least one buffer and a converter implemented via at least one of hardware and instructions stored on machine-readable media, the method comprising the steps:

storing a first operand having an optimal normal basis (ONB) format in a buffer;

using the converter to process the format of the operand and convert the format to an alternative representation format; and generating a result having the alternative representation formal by computing the inverse of the first operand and storing the result in a buffer.

2. The method of claim 1, wherein:

the finite field is defined as $GF(2^n)$; and the first operand is defined as a vector of n binary elements of the finite field GF(2), such that the first operand has the ONB format $(a_{n-1}, a_{n-2}, \ldots, a_1, a_0)$; and there is a prime $p=2n+1$, where p satisfies one of the following conditions:
    (i) the multiplicative order of 2 modulo p is 2n, or
    (ii) $p \equiv (3 \bmod 4)$ and the multiplicative order of 2 modulo p is n;

there is a one-to-one function $\pi: \{0, 1, 2, \ldots, n-1\} \rightarrow \{1, 2, 3, \ldots, n\}$ defined over $0 \leq i \leq n-1$, where $j=2^i \bmod p$, and if $0<j \leq n$, then $\pi(i)=j$, else $\pi(i)=p-j$; and there is an inverse function $\sigma: \{1, 2, 3, \ldots, n\} \rightarrow \{0, 1, 2, \ldots, n-1\}$ defined such that $\sigma(j)=i$ whenever $\pi(i)=j$; and wherein the step of permuting the format of the first operand from ONB to an alternative representation format includes permuting the first operand to the alternative format $(b_1, b_2, \ldots, b_n, b_n, \ldots, b_2, b_1)$ by setting $(b_1, b_2, \ldots, b_n)=(a_{\sigma(1)}, a_{\sigma(2)}, \ldots, a_{\sigma(n)})$.

3. The method of claim 2, including the step of permuting the result from the alternative format $(c_1, c_2, \ldots, c_n, c_n, \ldots, c_2, c_1)$ to the ONB format $(d_{n-1}, d_{n-2}, \ldots, d_1, d_0)$ by setting $(d_{n-1}, d_{n-2}, \ldots, d_1, d_0)=(c_{\pi(n-1)}, c_{\pi(n-2)}, c_{\pi(1)}, c_{\pi(0)})$, respectively.

4. The method of claim 1, wherein the converter is a palindromic converter and wherein:

using the converter to process the format of the operand includes manipulating bit positions of the operand to thereby convert the operand from a ONB format to palindromic format.

5. An apparatus for performing an arithmetic operation in a finite field, the apparatus comprising:

a first buffer configured to receive and store a first input operand having a first representation format;

a first format converter configured to convert the first input operand to a first converted operand having a second representation format;

a second buffer configured to receive and store the first converted operand;

a functional unit configured to receive the first converted operand from the second buffer and perform the arithmetic operation on the first converted operand in order to generate a first result having the second representation format;

a third buffer configured to receive and store the first result;

a second format converter configured to convert the first to a second result having the first representation format; and a fourth buffer configured to receive and store the second result.

6. The apparatus of claim 5, wherein:

the finite field is a Galois field defined as $GF(2^n)$ and:

there exists a prime $p=2n+1$, where p satisfies one of the following conditions:
    (i) the multiplicative order of 2 modulo p is 2n, or
    (ii) $p \equiv (3 \bmod 4)$ and the multiplicative order of 2 modulo p is n;

there is a one-to-one function $\pi: \{0, 1, 2, \ldots, n-1\} \rightarrow \{1, 2, 3, \ldots, n\}$ defined over $0 \leq i \leq n-1$, where $j=2^i \bmod p$, and if $0<j \leq n$, then $\pi(i)=j$, else $\pi(i)=p-j$; and there is an inverse function $\sigma: \{1, 2, 3, \ldots, n\} \rightarrow \{0, 1, 2, \ldots, n-1\}$ defined such that $\sigma(j)=i$ whenever $\pi(i)=j$; and the first buffer includes positions $(a_{n-1}, a_{n-2}, \ldots, a_1, a_0)$;

the second buffer includes positions $(b_1, b_2, \ldots, b_n)$; and the first format converter further comprises a network of connections between the first and second buffers, wherein an inter-connection pattern of the first format converter is $(b_1, b_2, \ldots, b_n)$ of the second buffer coupled to $(a_{\sigma(1)}, a_{\sigma(2)}, \ldots, a_{\sigma(n)})$ of the first buffer, respectively.

7. The apparatus of claim 6, wherein:

the third buffer includes positions $(c_1, c_2, \ldots, c_n)$;

the fourth buffer includes positions $(d_{n-1}, d_{n-2}, \ldots, d_1, d_0)$; and the second format converter further comprises a network of connections between the third and fourth buffers, wherein an inter-connection pattern of the second format converter is $(d_{n-1}, d_{n-2}, \ldots, d_1, d_0)$ coupled to $(c_{\pi(n-1)}, c_{\pi(n-2)}, \ldots, c_{\pi(1)}, c_{\pi(0)})$, respectively.

8. The apparatus of claim 7, wherein:

the first representation format in ONB;

the second representation format is palindromic; and the functional unit is a polynomial inverter.

9. The apparatus of claim 7, further including:
a fifth buffer configured to receive and store a second input operand having the first representation format;
a third format converter configured to convert the second input operand into a second converted operand having the second representation format; and
a sixth buffer configured to receive and store the second converted operand;
wherein the functional unit is further configured to perform the arithmetic operation on both the first and second converted operands in order to obtain the first result.

10. The apparatus of claim 9, wherein:
the fifth buffer includes positions $(e_{n-1}, e_{n-2}, \ldots, e_1, e_0)$;
the sixth buffer includes positions $(f_1, f_2, \ldots, f_n)$; and
the third format converter further comprises a network of connections between the fifth and sixth buffers, wherein an inter-connection pattern of the third format converter is $(f_1, f_2, \ldots, f_n)$ of the sixth buffer coupled to $(e_{\sigma(1)}, e_{\sigma(2)}, \ldots, e_{\sigma(n)})$ of the fifth buffer, respectively.

* * * * *